United States Patent
Kleppe et al.

(10) Patent No.: US 8,705,172 B2
(45) Date of Patent: Apr. 22, 2014

(54) MICROSCOPY METHOD AND MICROSCOPE WITH ENHANCED RESOLUTION

(75) Inventors: Ingo Kleppe, Jena (DE); Ralf Netz, Jena (DE); Yauheni Novikau, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 545 days.

(21) Appl. No.: 12/913,487

(22) Filed: Oct. 27, 2010

(65) Prior Publication Data

US 2011/0267688 A1 Nov. 3, 2011

Related U.S. Application Data

(60) Provisional application No. 61/350,204, filed on Jun. 1, 2010.

(30) Foreign Application Priority Data

Oct. 28, 2009 (DE) .......................... 10 2009 051 291

(51) Int. Cl.
*G02B 21/06* (2006.01)

(52) U.S. Cl.
USPC .......................................................... 359/385

(58) Field of Classification Search
USPC ................................................. 359/368–390
See application file for complete search history.

(56) References Cited

U.S. PATENT DOCUMENTS

| | | | | |
|---|---|---|---|---|
| 3,013,467 A | * | 12/1961 | Minsky | 356/432 |
| 3,926,500 A | * | 12/1975 | Frosch et al. | 359/235 |
| 5,296,703 A | * | 3/1994 | Tsien | 250/235 |
| 6,201,639 B1 | * | 3/2001 | Overbeck | 359/368 |
| 6,248,988 B1 | * | 6/2001 | Krantz | 250/201.3 |
| 6,399,935 B1 | * | 6/2002 | Jovin et al. | 250/216 |
| 7,468,834 B2 | * | 12/2008 | Wolleschensky | 359/370 |
| 7,808,701 B2 | * | 10/2010 | Ouchi | 359/388 |
| 7,978,403 B2 | * | 7/2011 | Brueck et al. | 359/370 |
| 2009/0147354 A1 | | 6/2009 | Arbuckle | |
| 2009/0161208 A1 | | 6/2009 | Kempe et al. | |
| 2009/0219607 A1 | | 9/2009 | Saggau et al. | |

FOREIGN PATENT DOCUMENTS

WO  WO 2004/053558 A1  6/2004
WO  WO 2007/109861 A1  10/2007

OTHER PUBLICATIONS

Heintzmann, Rainer, et al., "Breaking the resolution limit in light microscopy", Briefings in Functional Genomics and Proteomics 2006, 5(4):289-301.
Heintzmann, Rainer, et al., "Saturated patterned excitation microscopy—a concept for optical resolution improvement", J. Opt. Soc. Am. A 2002, 19(8):1599-1609.

* cited by examiner

*Primary Examiner* — Frank Font
(74) *Attorney, Agent, or Firm* — Duane Morris LLP

(57) ABSTRACT

Method for enhancing the resolution of a microscope during the detection of an illuminated specimen and a microscope for carrying out the method, wherein in a first position, an illumination pattern is generated on the specimen, the resolution of which is preferably within the range of the attainable optical resolution of the microscope or higher, wherein a relative movement, preferably perpendicular to the direction of illumination, from a first into at least one second position of the illumination pattern on the specimen is generated at least once between the detection and the illumination pattern with a step width smaller than the resolution limit of the microscope and detection and storage of the detection signals take place both in the first and in the second position.

12 Claims, 5 Drawing Sheets

Figure 2:
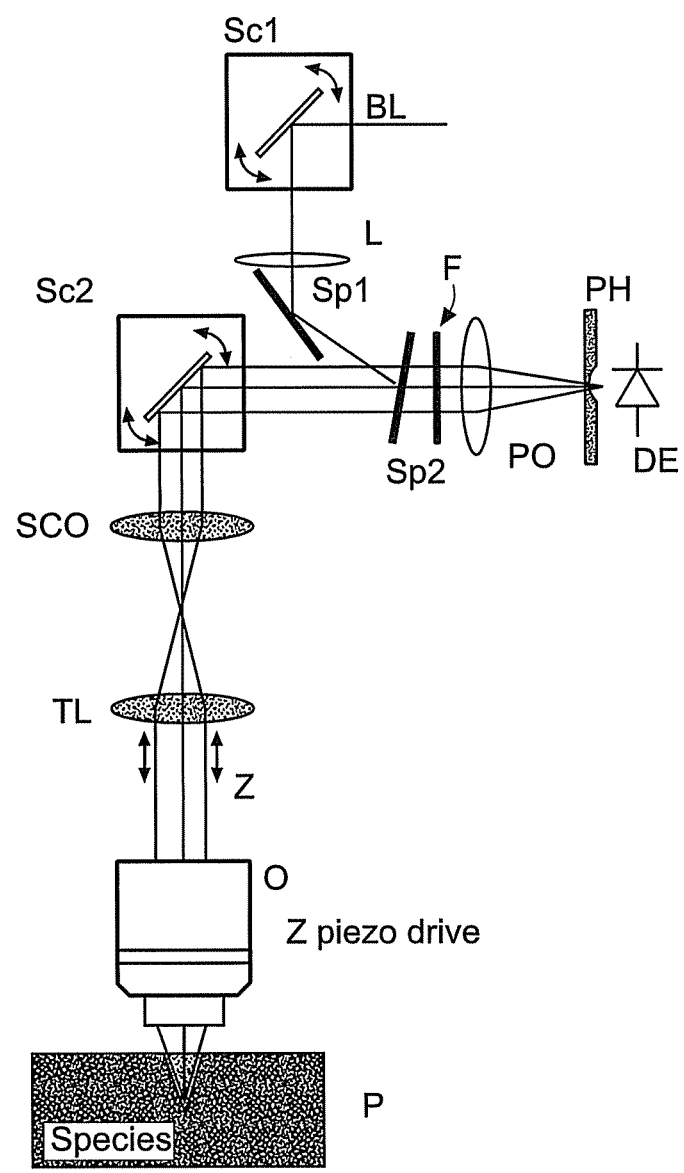

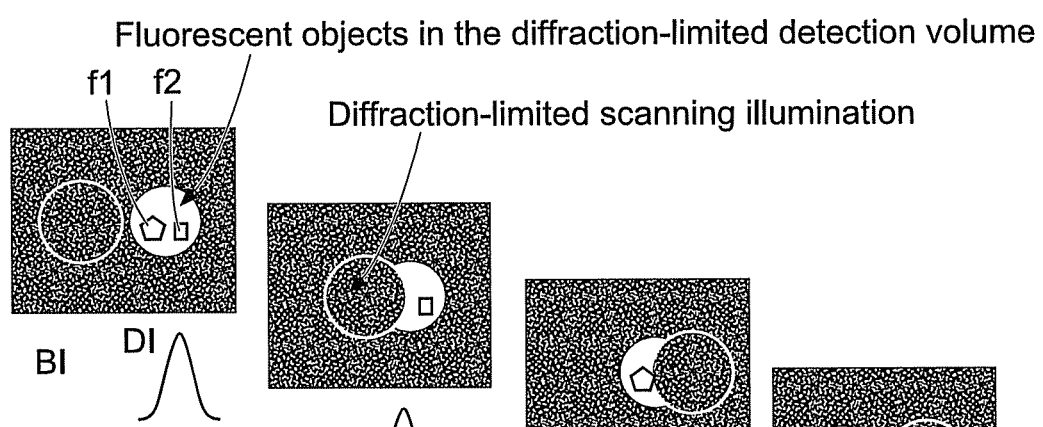
FIG. 1A
FIG. 1B
FIG. 1C
FIG. 1D
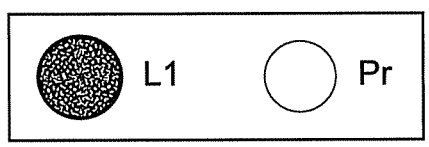

MICROSCOPY METHOD AND MICROSCOPE WITH ENHANCED RESOLUTION

RELATED APPLICATIONS

The present application is a nonprovisional application of Provisional Application No. 61/350,204 filed on Jun. 1, 2010 which claims priority benefit of German Application No. DE 10 2009 051 291.8 filed on Oct. 28, 2009, the contents of which are incorporated by reference in their entirety.

BACKGROUND OF THE INVENTION

Luminescence microscopy is a classic application of light microscopy for studying biological preparations. To this end, certain dyes (known as phosphores or fluorophores) are used to specifically mark specimens, e.g., cell components. As mentioned [sic], the specimen is illuminated with illuminating radiation that produces excitation radiation [sic] and the thereby excited luminescence radiation is detected with suitable detectors. Normally, the microscope for this purpose comprises a dichroic beam splitter in combination with block filters that separate the luminescence radiation from the excitation radiation and thereby make it possible to observe [the beams] separately. This method makes it possible to visualize individual cell components dyed in different colors under the microscope. It is, of course, also possible for several components of a preparation to be simultaneously dyed with different dyes which accumulate specifically in different structures of the preparation. This method is known as multi-luminescence. It is also possible to examine specimens that luminesce on their own, i.e., without the addition of dyes.

As generally accepted, luminescence in this context is used as a broader term for phosphorescence and fluorescence, i.e., it covers both phenomena. Thus, when this document makes reference to fluorescence, this should be understood as pars pro toto rather than as a restriction.

It is also known that, to investigate specimens, laser scanning microscopes (abbreviated as LSM) can be used, which, by means of a confocal detection configuration (known as a confocal LSM) or nonlinear specimen interaction (so-called multiphoton microscopy), display, out of a fully three-dimensionally illuminated image, only the plane that is located in the focal plane of the objective lens. Thus, an optical section is obtained, and the recording of a plurality of optical sections in different depths of the specimen subsequently makes it possible to generate, by means of a suitable data processing system, a three-dimensional image of the specimen, which image is composed of the various optical sections. Thus, laser scanning microscopy is useful when thick preparations are to be studied.

Obviously, a combination of luminescence microscopy and laser scanning microscopy can be used as well; in this case, a luminescent specimen is imaged in planes of various depths by means of an LSM.

U.S. Pat. No. 5,043,570 describes an attempt to enhance the resolution by means of "oversampling."

This does not lead to a markedly improved resolution below the diffraction limit of the microscope.

Due to the laws of physics, the optical resolution of a light microscope, including that of an LSM, is invariably diffraction-limited. For optimum resolution within these limits, special illumination configurations are known, such as the 4Pi configuration or configurations with standing-wave fields. As a result, the resolution, in particular in an axial direction, can be markedly improved over that of a conventional LSM. In addition, using nonlinear depopulation methods, the resolution can be enhanced to a factor of up to 10 compared to a diffraction-limited confocal LSM. Such a method has been described, for example, in U.S. Pat. No. 5,866,911. As to depopulation methods, several different approaches are known, such those described, for example, in DE 44 16 558 C2, U.S. Pat. No. 6,633,432 or DE 103 25 460 A1.

U.S. Pat. No. 5,867,604 discusses another high-resolution microscopy method in which an object with a periodic structure is scanned.

A similar method for enhancing the resolution is discussed in EP 1 157 297 B1. This method is said to utilize non-linear processes by means of structured illumination. This document mentions the saturation of fluorescence as an example of non-linearity. The method described claims to achieve a shift of the object space spectrum relative to the transfer function of the optical system by means of structured illumination. In concrete terms, a shift of the spectrum means that object space frequencies $V_0$ are transferred at a space frequency of $V_0-V_m$, with $V_m$ being the frequency of the structured illumination. At a given maximum space frequency that the system can transfer, this enables the transfer of space frequencies of the object that are above the maximum frequency of the transfer function by shifting frequency $V_m$. This approach requires a reconstruction algorithm for image generation and the evaluation of several image acquisitions for one image. Another disadvantage of this method is that the specimen, in areas outside the detected focus, is unnecessarily exposed to radiation since the necessary structured illumination passes through the entire specimen volume. Furthermore, this method can currently not be used for thick specimens, because out-of-focus excited fluorescence also reaches the detector as a background signal and thus dramatically reduces the dynamic range of the detected radiation.

A method which, irrespective of laser scanning microscopy, achieves a resolution beyond the diffraction limit is known from WO 2006/127692 and DE 10 2006 021 317. This method known by the acronym PALM (Photo Activated Light [sic; Localization] Microscopy) uses a marker substance which can be activated by means of an optical activation signal. Only when the marker substance is in the activated state is it possible for the substance to be excited with excitation radiation to induce a certain fluorescence radiation. Even when exposed to excitation radiation, non-activated molecules of the marker substance do not emit any fluorescence radiation, or at least do not emit noticeable fluorescence radiation. Thus, the activating radiation switches the marker substance into a state in which it can be excited to fluoresce. Other types of activation, e.g., thermal-type activation, are possible as well. Therefore, one generally speaks of a switching signal. In the PALM method, the switching signal is applied in such a manner that that at least a certain portion of the activated marker molecules are at a distance from the neighboring activated molecules so that, as measured against the optical resolution of microscopy, they are separate or can be subsequently separated. This means that the activated molecules are at least to a large extent isolated. After absorption of the luminescence radiation, the center of the radiation distribution associated with the resolution limit of these isolated molecules is determined for these molecules and, based thereon, the location of the molecules is mathematically determined with higher accuracy than optical imaging actually allows. In the English-language literature, this enhanced resolution obtained by mathematically determining the center of the diffraction distribution is also referred to as "superresolution." It requires that at least some of the activated marker molecules, with the optical resolution with which the luminescence radiation is detected, are distinguishable, i.e., isolated, in the specimen. If this is the case, such molecules can be localized with enhanced resolution.

To isolate individual marker molecules, the PALM method relies on the fact that the probability with which a marker molecule is activated by the activation radiation after receiving the switching signal of a given intensity, e.g., a photon, is the same for all molecules. Thus, by way of the intensity of the switching signal and thus the number of photons that impinge upon a unit area of the specimen, it can be ensured that the probability that marker molecules that are present in a given area of the specimen are activated is so low that there are sufficient areas in which only distinguishable marker molecules emit fluorescence radiation within the optical resolution. By properly choosing the intensity, e.g., the photon density, of the switching signal, it can be ensured that marker molecules in locations that are preferably isolated only relative to the optical resolution are activated and subsequently emit fluorescence radiation. Subsequently, the center of the diffraction-associated intensity distribution is mathematically determined for these isolated molecules and thus the location of the marker molecule with enhanced resolution is determined. To image the entire specimen, isolation of the marker molecules of the subset by introduction of activation radiation, subsequent excitation and fluorescence radiation imaging is repeated until preferably all marker molecules were at one time included in a subset and isolated within the resolution of the image.

The PALM method has the advantage that neither activation nor excitation requires a high spatial resolution. Instead, both activation and excitation can take place in wide-field illumination.

As a result, the marker molecules are statistically activated in subsets by properly choosing the intensity of the activation radiation. To generate an overall image of a specimen in which the locations of all marker molecules can be mathematically determined with a resolution that is, e.g., beyond the diffraction limit, it is therefore necessary for a plurality of individual images to be evaluated. This may involve up to 10,000 individual images. This means that large amounts of data are processed and, accordingly, the measurement may take a long time. Even just capturing an overall image requires several minutes, which is essentially determined by the readout rate of the camera used. The location of the molecules in the individual images is determined by means of complicated mathematical procedures, such as have been described, for example, by Egner et al., Biophysical Journal, pp. 3285-3290, Volume 93, November 2007. Typically, it takes 1-2 h to process all individual images and to assemble them to create a high-resolution overall image, i.e., one image, in which the locations of the marker molecules with a resolution beyond the diffraction limit are identified.

Other articles on high-resolution methods include:

Hell, S. W. (2007): "Far-Field Optical Nanoscopy," Science 316, pp. 1153-1158, and on SAX (Saturated Excitation) Microscopy: Fujita et al., Phys. Rev. Lett. (2007), Yamanaka et al., J. Biomed. Opt. (2008).

The prior-art high-resolution methods have a number of disadvantages:

The disadvantage of the STED method is the availability of dyes and the high laser intensity required. The RESOLFT/GSD method requires a high number of switching cycles. In the PALM/STORM method, the image generation rate is slow, and SAX microscopy causes considerable bleaching of the dyes.

SUMMARY OF THE INVENTION

The present invention describes a method and a device for achieving a microscopic resolution below the diffraction limit of the microscope as disclosed in the independent claims. Preferred improvements are discussed in the dependent claims.

The invention describes a method by means of which it is possible to generate high-resolution images even for specimens that are more complex than a specimen consisting of individual molecules. To this end, the method according to the present invention utilizes the spatial change of gray scale distributions.

DESCRIPTION OF THE EMBODIMENTS

The method comprises the following important steps:

The illumination (an illumination pattern) for detection is shifted with an accuracy that is above the attainable optical resolution.

During the shift, several images with the highest attainable optical resolution are captured, which images correspond to a certain shift location of the illumination pattern.

Based on the detected signals, for example, a fluorescent signal, of the individual images, a high-resolution image is calculated.

Using nonlinear excitation and the relevant fluorescent markers, the resolution can be further enhanced.

In FIG. 1$a$-$d$), the central idea of the invention is shown with the aid of an illumination spot of a laser scanning microscope.

It shows how the scan field of a laser scanning microscope (LSM), see also FIG. 2, is moved across the specimen by shifting it with appropriate means (stage motion, second scanner). L1 is the light spot of the LSM that is moved in a defined scanning pattern across the specimen.

To generate an image of the specimen, detection values are linked to the individual locations, for example, of a point light beam. Because of the diffraction limitation of the optical image, the individual scanned points are located at a minimum distance from one another (for example, 20 nm).

By way of an example, two fluorescent objects f1, f2 can be seen in a specimen region Pr in the specimen.

In FIG. 1$a$, f1, f2 are not detected since the entire scanned region of L is outside the specimen region Pr in which f1, f2 are located.

In FIG. 1$b$, object f1, due to the shift of the scan field (the illumination pattern generated by the LSM) against the [sic] by an amount below the resolution limit, for example, 10-20 nm, is within the detection region of laser spot L and emits a detection signal.

In FIG. 1$c$, the detection signal, due to the continued shift of L1, is derived from f2.

In FIG. 1$d$, objects f1, f2 are again not picked up by L.

FIG. 1 also shows the distributions of the relevant illumination intensity Bi and detection intensity Di.

The calculation method for separating/reconstructing the signal of the individual objects by deconvolution of the signals will be discussed below.

Since the illumination spot, for example, in an LSM, can be adjusted with greater accuracy than the diffraction-limited resolution of the microscope, it is possible to enhance the resolution by shifting the illumination pattern relative to the detection.

FIG. 2 illustrates a potential embodiment of the present invention.

The configuration comprises a laser scanning microscope, the basic principle of which has already been repeatedly and thoroughly explained, for example, in DE 197 02 753.

According to the present invention, however, the illuminating light BL in this case is directed via a first scanner SC1, lens L and deflecting mirror SP1 and a partially reflecting mirror SP2 in the direction of a second scanner SC2 (of the X/Y scanner of the LSM), and from this second scanner via an optical scanning system SCO, a tubular lens TL and optical system O focused on specimen P.

On the return path, the specimen light passes through SC2, SP2, filter F, an optical pinhole system PO and a pinhole PH and reaches a detector DE for confocal detection.

It is useful to combine a fast scanner SC2 (LSM) with a slow scanner SC1.

Scanner SC1 shifts the illumination pattern of the LSDM relative to the detection, as already shown in FIG. 1.

With each step of scanner SC1, the specimen is scanned with SC2. This causes a Gaussian illumination function (FIG. 1) to be slowly moved across the specimen relative to the detection.

The shift and each image acquisition take place, for example, in 10-nm steps.

The number of the individual positions depends on the intended resolution.

Instead of using scanner SC1 to move the scan field, it might also be possible to slowly move the specimen with a high-precision specimen stage.

Of special advantage is the simultaneous use of a plurality of confocal detectors, one of which always follows the excitation (standard confocal) while other detectors, independently thereof, look confocally into the specimen. One advantage is that all of the fluorescent light is utilized, the other advantage is that the SNR is improved, which can also be included in the evaluation since several measured points are detected for the same illumination.

Figure 3:
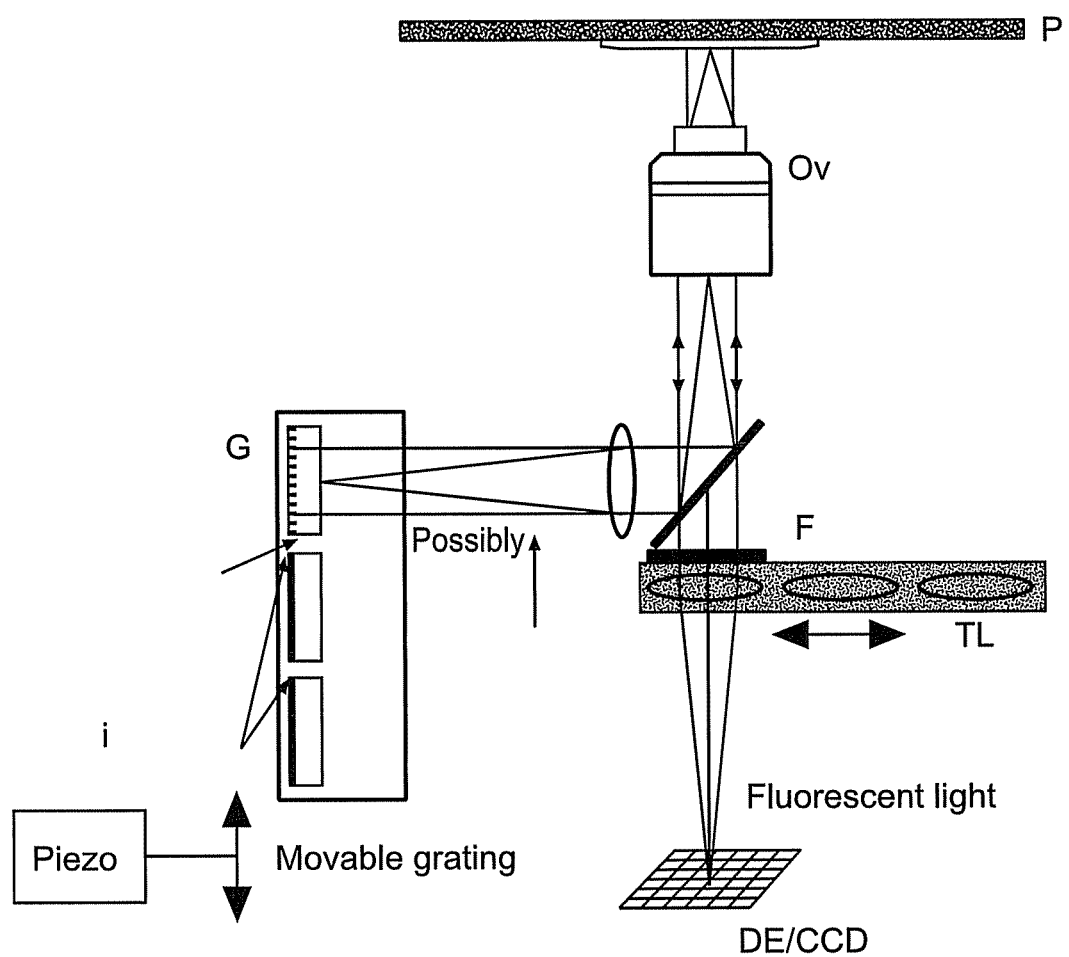

FIG. 3 shows a wide-field embodiment of the invention with a grating for illumination modulation. Instead of a grating, a light pattern or interference pattern giving the same optical effect can be used.

Specimen P is illuminated through a multiline grating G and optical system O in the wide field (by means of a light source that is not shown).

To separate the illumination light from the detection light, a beam splitter ST is used.

The specimen light is detected in a spatially resolved manner via filter F, exchangeable tubular lenses TL and a CCD receiver DE.

Through the multiline grating, illuminated lines are generated on the specimen.

By shifting the grating relative to the specimen, a static scan field, represented by the illuminated lines, is, so to speak, moved with high precision, for example, by means of a piezo drive PZ. The magnitude of the shift is smaller than the distance between the illuminated lines on the specimen.

As a result of the shift of the grating, the modulated illumination radiation that is determined by the known grating modulation is correlated with the detection modulation as in FIG. 1, and a high-resolution image can be calculated.

Figure 4:
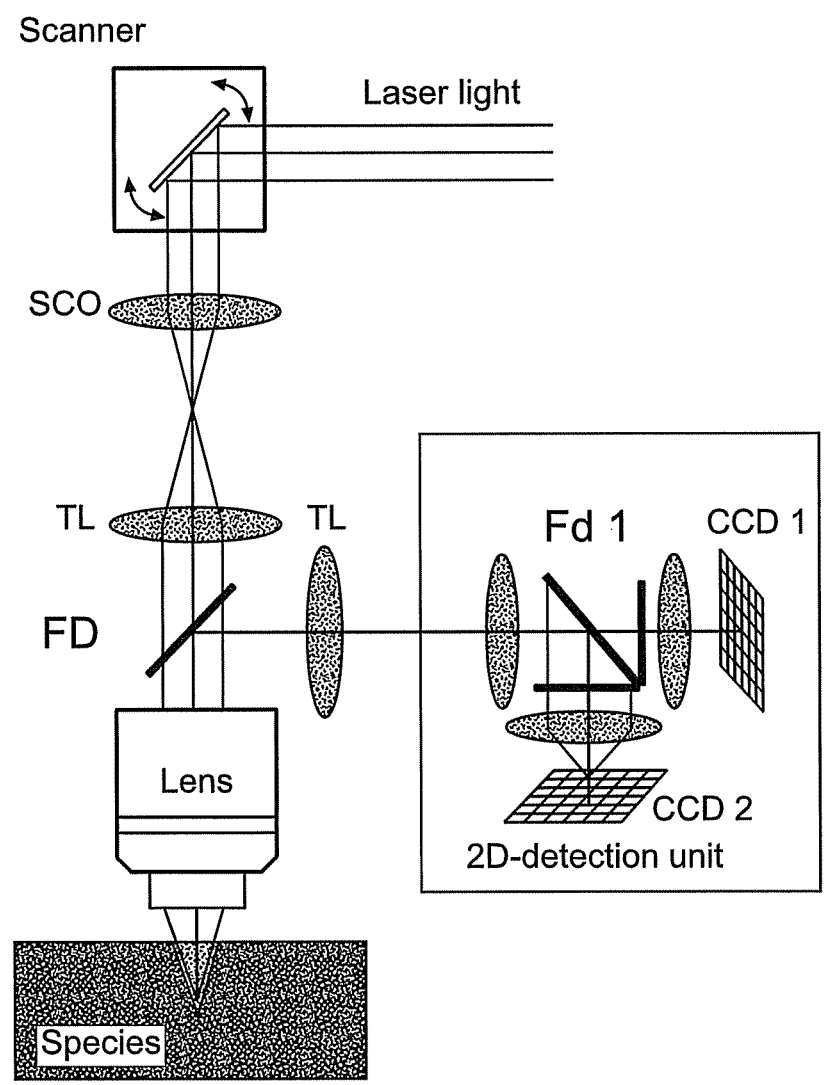

FIG. 4 shows a non-descanned screening-out of the detection, in which laser light is moved across the specimen so as to scan it, via a dichroic mirror Fd, in the direction of a detector configuration, in this case preferably with two detectors CCD1 and CCD2 in transmission and reflection of a dichroic mirror Fd1, which detectors can detect, for example, different wavelengths.

A configuration of CCD1 and CCD2 in different Z-planes to increase the Z-resolution (direction of the optical axis) might also be useful.

According to the present invention, the resolution can be enhanced, as already mentioned above, by shifting the scan field and the associated signals on the detectors CCD1 and CCD2 by small increments.

The shift can be made by moving the detection slightly, for example, along an X-direction perpendicular to the optical axis Z or, for example, by moving the specimen or by means of a second scanner, as described in connection with FIG. 2.

Figure 5:
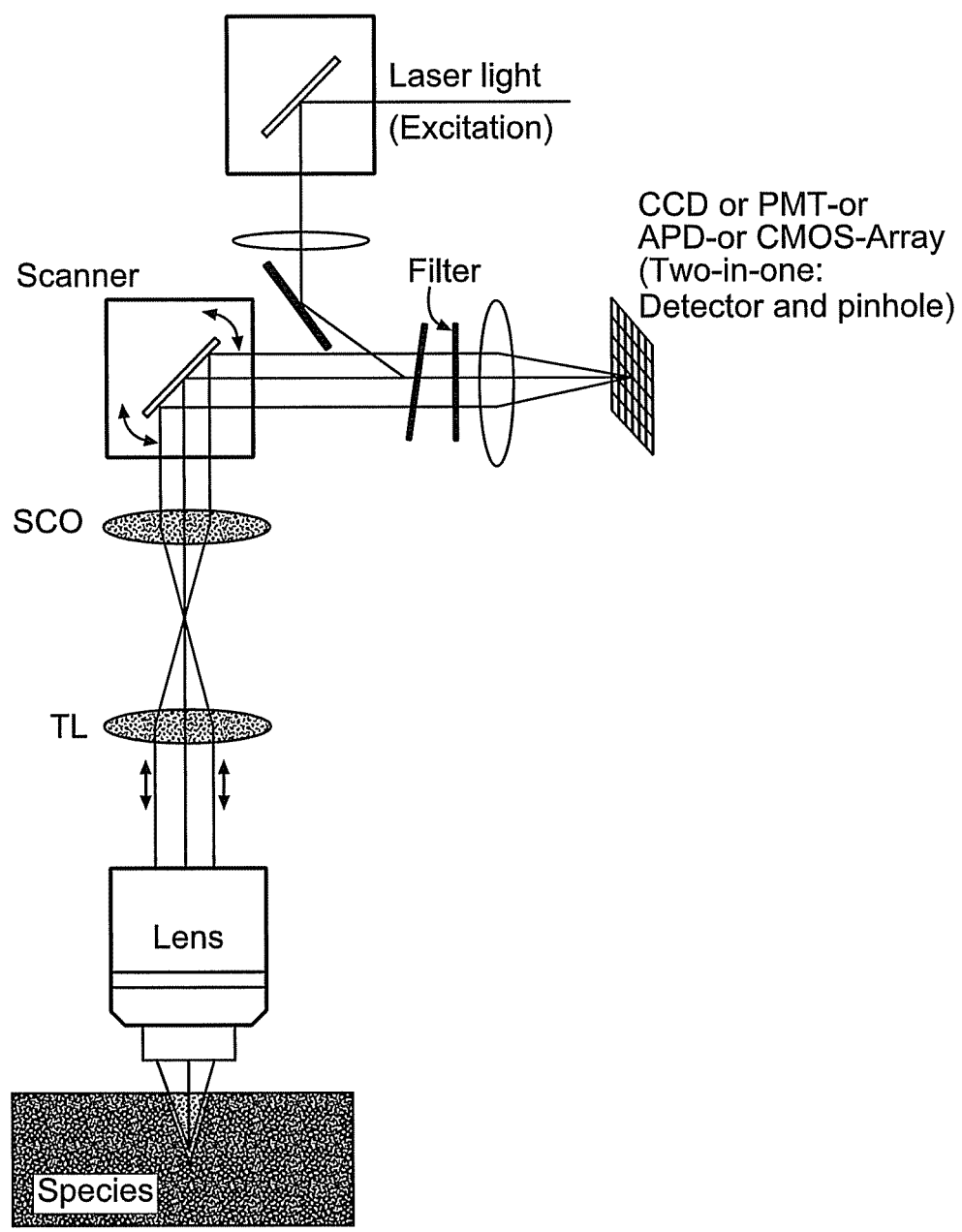

FIG. 5 shows a configuration similar to that shown in FIG. 2, in which descanned imaging takes place onto an area detector, such as a CCD receiver or a PMT or APD or CMOS array. In this case, the pinhole of the scanning microscope can be replaced by reading out only certain detector pixels.

Each detector unit detects quasi-confocally.

The shift required for the detection in the other embodiments described above is here simulated by a "shift" in terms of a switch between preferably neighboring detector elements (pixels).

By suitably switching the detector pixels, it is possible to adjust shifts relative to the detection, which shifts are equivalent to those in the above-described embodiments, without the need to generate a direct mechanical movement.

The pixel shift has the beneficial effect of shifting a detection field relative to an illumination field.

By analogy, this is also possible in the case of a non-descanned detection as in FIG. 4, thereby conveniently obviating, for example, the need for an additional movement of, for example, the specimen.

Obviously, a prerequisite for resolution enhancement (taking into consideration the image scale of the optical imaging system of the microscope) is that the effective pixel size in the location of the detector measures only a fraction of the half-width of the PSF, for example, a quarter.

The important advantages of embodiment 5 which has been described above in connection with FIG. 5 can be summarized as follows:

Since the diffraction-limited point is characterized by "modulation/structurization" laterally in all spatial directions, one can continue to use the scan mode of the LSM (in the x- and y-directions) and still achieve an approximately isotropic resolution enhancement. When scanning the illumination, the illumination increases and then decreases in all spatial directions because of the point-shaped structurization. This is of advantage when compared to structured illumination, which requires at least 3 spatial directions. This also offers the benefit of higher speed to other configurations that use the point scanner.

Each diffraction-limited point already has the highest possible spatial frequency and the strongest modulation.

The array detector is configured so that each detector sub-unit (pixel) detects confocally. This, in addition to the confocal background suppression, results in a lateral resolution enhancement which exceeds that of the confocal LSM.

The array detector parallelizes the otherwise necessary additional scanning of the excitation over the detection spot!

Enhancement of the Vertical (Z-) Resolution:

High resolution according to the present invention can similarly also be achieved in the vertical (Z) direction in that, while conventionally scanning the specimen in Z-stacks, a distance between the focal plane and the illumination plane is created by an additional shift in the Z-direction and this distance is detected. For example, in FIG. 2, provision can be made for a lens that can be shifted in the Z-direction, as schematically shown by reference to the tubular lens TL with arrows in the Z-direction, in order to bring the focus, which is adjusted, for example, by means of a piezo lens in Z-direction to capture Z-stacks, into intermediate positions between the individual Z-positions while images are captured.

The invention can also be implemented with a line scanner in that, by analogy to FIGS. 2 and 3, the specimen or the scan field is moved.

The line scanner offers the special advantage of allowing images to be captured at a considerably higher speed while maintaining confocality.

Other applications in which patterns are rapidly moved across the specimen, with the scanned detection image being moved across the specimen as disclosed by the present invention, fall within the scope of the invention, such as the use of spatial light modulators/DMDs for illumination.

A generalization of the principle leads to the following method for reconstructing specimen information that has a dimension below the diffraction limit.

Basic Considerations:

The intensity in each image point can be expressed by the following formula:

$$D(x_0) \propto \int_{-\infty}^{\infty} H(x-x_0) \cdot I(x) \cdot c(x) dx$$

in which c(x) is the concentration of the fluorophores, H is the point spread function of the detection, l(x) is the illumination intensity in location x which, in the case of a scanning microscope, represents the point spread function of the illumination.

In case of a pixelated camera detector, the integral is transformed into a Riemann sum.

When the excitation spot or the excitation pattern is moved with high precision along the x-direction across the specimen, the following system of equations is obtained:

$$D_{1,j} = \sum_j I_{1,j} \cdot c_j \cdot H_{1,j}$$

$$D_{2,j} = \sum_j I_{2,j} \cdot c_j \cdot H_{2,j}$$

$$\vdots$$

$$D_{n,j} = \sum_j I_{n,j} \cdot c_j \cdot H_{n,j}$$

in which n is the index for the various illumination settings and j is the index for the detector (camera) pixel.

Since the illumination pattern as well as the point spread function H are generally well known, it is relatively easy to solve the extremely overdetermined system of equations, e.g., by means of pseudo matrix inversion ("Penrose-Moore inverse") along the lines of the "Zeiss unmixing" algorithm.

The signal-to-noise ratio of the overscan region limits the possible resolution.

In this respect, the laser scanning microscope is ideal since the spots intrinsically reach the diffraction limit. The number of the iterations required will be small. Generally the number of iterations compared to the modulation depth can be optimized with the signal to noise for each measurement to achieve the best resolution enhancement.

It should be noted that the resolution is enhanced only in the scan direction. Similar to the structured illumination method, scanning the specimen in at least three directions makes it possible to reconstruct image information at a higher resolution from the measured data.

Mathematical Formalism:

The one-dimensional image is expressed by the following integral:

$$D(x,p) = \int_{x'} O(x')E(x'-p)H(x-x')dx'$$

in which O(x) is the object, E(x) is the excitation profile (p is the phase or the offset of the excitation profile in different scans), and H(x) is the point spread function (PSF) of the detection.

Representation of the Measured Signal in the Fourier Space:

D(x,p) can be Fourier transformed with respect to the x-coordinate or with respect to the p-coordinate.

Structured Illumination

When D(x,p) is Fourier transformed with respect to x, one obtains:

$$D^f(\omega,p) = FT_{x'}\{O(x')E(x'-p)\}H^f(\omega)$$

Product A in the position space becomes a convolution in the Fourier space:

$$D^f(\omega, p) = \left\{ \int_\omega O^f(\omega')E^f(\omega-\omega', p)d\omega' \right\} H^f(\omega)$$

or $$D^f(\omega, p) = \{O^f(\omega) \otimes E^f(\omega, p)\}H^f(\omega)$$

In the Fourier space, the discrete representation of $E^f(\omega,p)$ has the following form:

$$E^f(\omega, p) = \sum_n e_n(p)\delta(\omega - \omega_n)$$

Ultimately, one obtains:

$$D^f(\omega, p) = \sum_n e_n(p)O^f(\omega - \omega_n)H^f(\omega) \quad (1)$$

If the excitation profile has a simple exponential form, then the following holds:

$$E^f(\omega,p) = A\delta(\omega) + B(\omega,p)\delta(\omega+\omega_g) + B(-\omega_g,p)\delta(\omega-\omega_g)$$

and equation (1) is transformed into $$D^f(\omega,p) = \{AO^f(\omega) + B(-\omega_g,p)O^f(\omega-\omega_g) + B(\omega_g,p)O^f(\omega+\omega_g)\}H^f(\omega) \quad (2)$$

Mathematically, equation (2) embodies the classic concept of structured illumination, where $E^f(\omega,p)$ defines the detection bands and the detection OTF $H^f(\omega)$ determines the weighting of the bands.

Scanning Illumination

When D(x,p) is Fourier transformed with respect to p, then the following holds:

$$D^f(x,\omega) = FT_{x'}\{O(x')H(x-x')\}E^f(\omega)$$

Product A in the position space becomes a convolution in the Fourier space:

$$D^f(x, \omega) = \left\{ \int_\omega O^f(\omega') H^f(x, \omega - \omega') d\omega' \right\} E^f(\omega)$$

or $$D^f(x, \omega) = \{O^f(\omega) \otimes H^f(x, \omega)\} E^f(\omega)$$

In the Fourier space, $H^f(x,\omega)$ can be represented as a discrete series of frequency components:

$$H^f(x, \omega) = \sum_n h_n(x) \delta(\omega - \omega_n)$$

Then the formula for the detected image is:

$$D^f(x, \omega) = \sum_n h_n(x) O^f(\omega - \omega_n) E^f(\omega) \quad (3)$$

Compared to equation (1), excitation and detection have been exchanged in equation (3).

For simple exponential excitation $$E^f(\omega) = A\delta(\omega) + B\delta(\omega + \omega_g) + B\delta(\omega - \omega_g)$$

3 frequencies contribute to the signal. However, since the detection OTF $H^f(x,\omega)$ comprises a (quasi-) continuous spectrum of frequencies, all frequencies that result from the sum of $\omega_g$ and the highest frequency component in $H^f(x,\omega)$ that differs from noise contribute to the signal.

Position Space (Camera):

The signal detected at a CCD pixel is:

$$D(x_k, p) = \int_{x_k-\Delta x}^{x_k+\Delta x} D(x, p) dx = \int_{x'} O(x') E(x' - p) dx' \int_{x_k-\Delta x}^{x_k+\Delta x} H(x - x') dx =$$

$$\int_{x'} O(x') E(x' - p) \hat{H}(x_k, x') dx'$$

We will consider two pixels detected at position $x_k$ and $x_k + \Delta x$:

$$D(x_k, p) = \int_{x'} O(x') E(x' - p) \hat{H}(x_k, x') dx'$$

$$D(x_k + \Delta x, p) = \int_{x'} O(x') E(x' - p) \hat{H}(x_k + \Delta x, x') dx'$$

As the object to be reconstructed $O(x)$, we will consider a set of preferably evenly distributed points $h_i$, $i=1, \ldots, m$:

$$O(x) = \sum_{i=1}^m a_i \delta(x - h_i) \quad (4)$$

in which $O(x)$ is the Dirac delta function and $a_i$ are the image signals to be reconstructed. In the given model, "oversampling" can be quantified with m/2. With equation (4), the detected pixels $D(x_k,p)$ and $D(x_k+\Delta x,p)$ take the following form $$D(x_k, p) = \sum_{i=1}^m a_i E(h_i - p) \hat{H}(x_k, h_i)$$

$$D(x_k + \Delta x, p) = \sum_{i=1}^m a_i E(h_i - p) \hat{H}(x_k + \Delta x, h_i)$$

If, in addition, the excitation profile is a cosine and the PSF $H(x)$ a Gaussian profile, we obtain:

$$D(x_k, p) = \sum_{i=1}^m a_i \cos\{\omega(h_i - p)\} \hat{H}(x_k, h_i) \quad (5)$$

$$D(x_k + \Delta x, p) = \sum_{i=1}^m a_i \cos\{\omega(h_i - p)\} \hat{H}(x_k + \Delta x, h_i)$$

with $$\hat{H}(x_k, x') = \int_{x_k-\Delta x}^{x_k+\Delta x} H(x - x') dx = \int_{x_k-\Delta x}^{x_k+\Delta x} \exp\{-(x-x')^2/(2\sigma^2)\} dx$$

The standard deviation $\sigma$ can be approximately described with $\sigma = 0.21 \lambda \text{NA}$, where $\lambda$ is the emission wavelength and NA the numerical aperture.

The two sets of linear algebraic equations (5) can be solved with respect to the unknowns $a_0$ and $a_1$. It should be noted that the equations (5) are additionally parameterized by the phase of the excitation profile. It is therefore possible to generate more linearly independent equations for different phases p. This increases the information content of the set of equations (5) and ultimately leads to a more precise reconstruction with enhanced resolution.

Finally, the system of equations can be given in matrix form:

$$D = SA$$

in which $$D = [D(x_k, p_1), D(x_k + \Delta x, p_1), \ldots, D(x_k, p_n), D(x_k + \Delta x, p_n)]^T$$

$$S = \begin{bmatrix} \cos\{\omega(h_i - p_1)\} \hat{H}(x_k, h_i) \\ \cos\{\omega(h_i - p_1)\} \hat{H}(x_k + \Delta x, h_i) \\ \ldots \\ \cos\{\omega(h_i - p_n)\} \hat{H}(x_k, h_i) \\ \cos\{\omega(h_i - p_n)\} \hat{H}(x_k + \Delta x, h_i) \end{bmatrix}_{i=1,\ldots,m}$$

$$A = [a_i]_{i=1,\ldots,m}^T$$

and n is the number of scans.

The elements of matrix D are measured values, i.e., they are somewhat flawed by error $\Delta D$.

These errors carry over into solution A so that A is flawed by error $\Delta A$.

As known, the error of A is linked to the error of D via $$\frac{\|\Delta D\|}{\|D\|} \leq \kappa(S) \frac{\|\Delta A\|}{\|A\|}$$

in which $\kappa(S) = \|S\| \|S^{-1}\|$ is the condition number of matrix S and $\|\ \|$ is the standard of the matrix.

The higher the condition number, the less resistant is the system with respect to the errors of the input data.

One possibility for estimating the condition number is to use singular values of matrix S:

$$\kappa(S) = s_{max}(S)/s_{min}(S)$$

where $s_{max}(S)$ and $s_{min}(S)$ are, respectively, the maximum and minimum singular values of S.

Thus, the condition number is a measure for how well the high-resolution information can be reconstructed. From the derivation, it becomes clear that the enhancement of the resolution is dependent on the interplay of two factors:

Of the signal-to-noise ratio, similar to the conventional deconvolution. This means that because of noise, the above-described equations may no longer be recognized as being linearly independent and therefore can no longer contribute to the solution. The solution loses uniqueness.

The steepness of the illumination PSF. The higher the modulation, the better will be the chance to obtain linearly independent information which can contribute to the solution of the system of equations.

The enhancement of the resolution should be [incomplete sentence, possibly, "higher"] by a factor of two [than that of] the confocal resolution since the scanning illumination, like the structured illumination, with its frequencies pushes the resolution limit upward. However, since the highest frequency that can be imaged in the specimen with light through the lens is just as diffraction-limited, the factor two results as above as well as in structured illumination. However, in this case, the starting point is the confocal resolution rather than the resolution of the wide-field microscope in structured illumination.

First experiments have resulted in a resolution of <90 nm.

Modulated Illumination:

Because of the drop of the PSF, the method described (i.e., to scan excitation via detection) has the disadvantage, both on the detection and on the excitation side, that if excitation and detection overlap even only slightly, the measured intensity and thus the signal-to-noise ratio are low. Modulation of the illumination, e.g., increasing the laser intensity by means of an AOTF or direct modulation of the laser or, in the case of pulsed illumination, adjusting the pulse rate or height or adjusting the exposure time, etc., can completely eliminate this effect and markedly improve the SNR for these data points. In a closed-loop control circuit, a change in the intensity or modulation can be a directly controllable variable by means of which an optimum detection signal can be obtained.

It is especially attractive to maintain the signal-to-noise ratio SNR constant throughout the process or to even increase it in the regions in which there is a slight overlap between excitation and detection in order to markedly improve the deconvolution (the process of solving the above-described linear system of equations) and thus the resolution in the image. The system of equations for the image points with only a slight overlap is small since most of the detected points are not illuminated, and therefore make no contribution. Thus, the more precisely these intensities are measured, the better the possibility of solving this small system of equations with only a few unknowns.

Expressed in more general terms, by improving the SNR, modulation makes it possible to fully utilize the measured linearly independent information rather than losing it in the noise.

Based on these considerations, it becomes obvious that a combination of this technique with DIM (Dynamic Illumination Microscopy) or CLEM (Controlled Light Exposure Microscopy) is especially useful since it would allow one to ensure a predefined optimum SNR for each point by controlling the illumination.

In addition, a combination with the following nonlinear methods is possible and useful:

STED/RESOLFT, since the PSF in these techniques is already steeper by a factor of 2-3 so that the resolution enhancement generated as a result thereof is an additional bonus.

Use of photoactivatable dyes, since the PSF of the activation and fluorescence excitation will multiply [sic] and the effective PSF thereby becomes steeper.

All methods, such as saturation of the dye, etc., that can also be used for the nonlinear structured illumination (R. Heintzmann, T. M. Jovin, and C. Cremer, Saturated patterned excitation microscopy—A concept for optical resolution improvement, J. Opt. Soc. Am. A, 19 (8), pp. 1599-1609, 2002).

Multiphoton microscopy (EP 500 717 B2)

Potential useful and surprising implementations of the invention are listed without claim to completeness:

Insertion of a Diaphragm in the Intermediate Image:

The method also functions in simpler systems in which, on the illumination side, the same method can be used by inserting a diaphragm in the intermediate image. The edge of the illumination serves as illumination weighting and is used for deconvolution.

Wide-field illumination with a sharp edge is, in the widest sense, commensurate with a structurization of the illumination.

The use of this method is of special advantage in reflection (without fluorescence) since the signal-to-noise ratios are generally considerably better in reflection (for example, point scanners in material microscopy).

Spinning Disk

The method can also be used to advantage in a spinning disk setup. Illumination takes place only through the disk, and detection takes place on a camera without pinhole. Confocality can be achieved with software/image processing on the camera (virtual pinhole). The accuracy with which scanning [incomplete sentence, word or words missing] detection and specimen, can be determined by the manner in which the disk is constructed, which is extremely useful and which avoids sources of error during the mathematical analysis.

SPIM

SPIM technology has been described, for example, in DE 102 57 423 A1 and WO 2004/0530558.

The use of the method according to the present invention in combination with SPIM leads to a higher resolution in the axial direction when the light sheet is being scanned. The resolution in the lateral direction can be enhanced, for example, by structuring the light sheet, the phase of which is passed through the specimen while scanning it. The result is that the method combines all of the typical advantages of SPIM with the added bonus of resolution enhancement!

CARS, SHG, RAMAN: Since fluorescence and linearity of the excitation are not in any way a prerequisite of this method, it can be combined to advantage with methods, such as CARS, second harmonic generation or stimulated RAMAN.

What is claimed is:

1. A method for enhanced resolution using a microscope having a detecting device and a resolution limit resulting in a minimal resolvable length, an imaging scale, and a point spread function comprising a half-width, wherein the method comprises the following steps:

illuminating a specimen with a modulated illuminating field pattern in form of a diffraction-limited point, imaging the illuminated specimen onto the detecting device, wherein the detecting device includes a confocal detector or a 2D detector which has pixels having a pixel size of, under consideration of the image scale, less than the half-width of the point spread function of the microscope, stepwise moving the diffraction-limited point relative to the specimen, with a step width of the movement being smaller than the minimal resolvable length, and storing a detection signal for each step of the movement.

2. The method of claim 1, wherein a high-resolution image is generated by mathematically analyzing the stored detection signals.

3. The method of claim 1, wherein the relative movement is effected perpendicular to an optical axis of the microscope or is effected along the direction of the optical axis of the microscope.

4. The method of claim 1, wherein the 2D detector is used and moving the illuminating field pattern comprises moving the illuminating field pattern along a direction being defined by a vector x, and wherein the method further comprises:

obtaining a signal intensity D for each step of the movement;

setting the illumination intensity for steps 1, 2, . . . n;

generating a system of equations $$D_{1,j} = \sum_j I_{1,j} \cdot c_j \cdot H_{1,j}$$

$$D_{2,j} = \sum_j I_{2,j} \cdot c_j \cdot H_{2,j}$$

$$\vdots$$

$$D_{n,j} = \sum_j I_{n,j} \cdot c_j \cdot H_{n,j}$$

in which c is a concentration distribution of fluorophores in the specimen, H is the point spread function, I is an illumination intensity distribution as a function of x and j is a index of the pixels, and solving the systems of equations for c as a function of x.

5. The method of claim 1, wherein the illuminating step comprises providing a wide-field illumination and producing the illumination pattern projecting a light distribution or by using a perforated disk.

6. The method of claim 1, wherein the relative movement is produced by one of the following moving the specimen;

moving a scan field;

moving read-out detector elements, and;

moving an illumination pattern.

7. A raster scanning microscope for illuminating a specimen and comprising a microscope system having a resolution limit resulting in a minimal resolvable length having an imaging scale, and having a point spread function comprising a half-width, and a detection unit comprising a confocal detector or a 2D detector which has pixels having a pixel size of, under consideration of the image scale, only a fraction of the half-width of the point spread function of the microscope, wherein the raster scanning microscope further comprises:

an illuminating device for generating a modulated illumination field pattern in form of one diffraction-limited point on the specimen, a scanning device for generating a stepwise relative movement between the specimen and the illumination pattern with a step width of the movement being smaller than the minimal resolvable length and a storage device for storing of detection signals from the detection unit for each step of the movement.

8. The microscope of claim 7 with means and/or software for mathematically analyzing the stored detection signals and for generating a high-resolution image.

9. The microscope of claim 8, wherein the means and/or software are configured to perform:

illuminating a specimen with a modulated illuminating field pattern in form of a diffraction-limited point, imaging the illuminated specimen onto the detecting device, wherein the detecting device includes a confocal detector or a 2D detector which has pixels having a pixel size of, under consideration of the image scale, less than the half-width of the point spread function of the microscope, stepwise moving the diffraction-limited point relative to the specimen, with a step width of the movement being smaller than the minimal resolvable length, and storing a detection signal for each step of the movement.

10. The microscope of claim 7 wherein the microscope is a wide-field microscope with structured illumination.

11. The microscope of claim 10 wherein the microscope is a wide-field microscope with structured illumination comprising a projected intensity distribution or a Nipkow disk.

12. The microscope of claim 7, wherein the scanning device includes one of the following:

means for moving the specimen;

means for moving a scan field;

means for generating a movement of read-out detector elements; and means for moving a grating or illumination pattern.

* * * * *